Sept. 24, 1946. E. L. JOHNSON 2,408,145
GARMENT HANGER
Filed Oct. 30, 1944
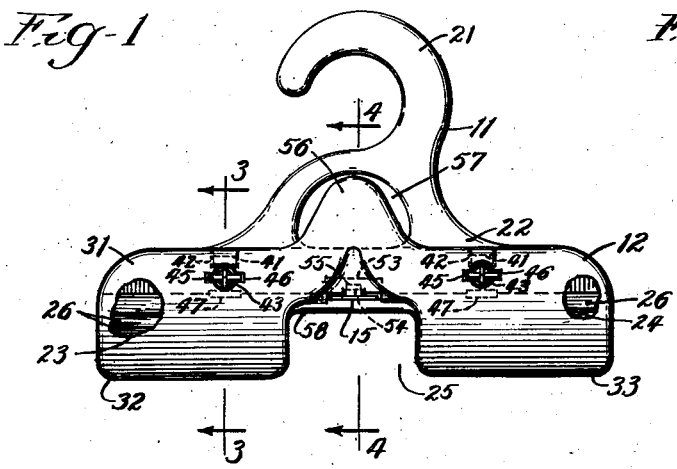
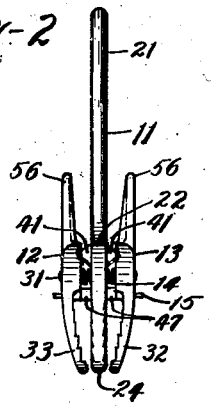
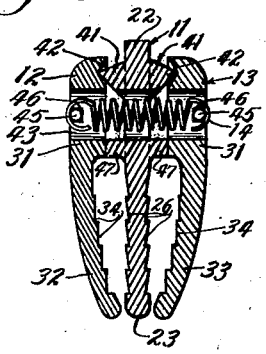
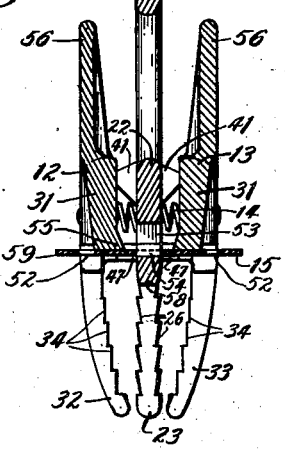
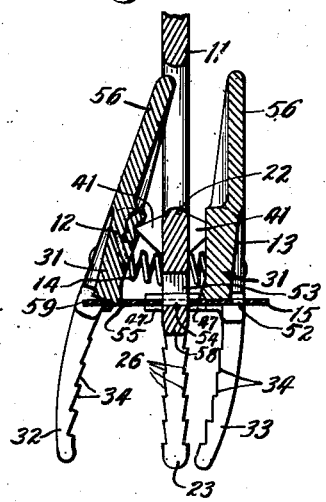
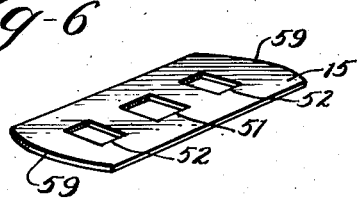
Inventor
Elmer L. Johnson
By:—
Raymond W. Schmoor
Atty.

Patented Sept. 24, 1946

2,408,145

UNITED STATES PATENT OFFICE 2,408,145

GARMENT HANGER

Elmer L. Johnson, Chicago, Ill.

Application October 30, 1944, Serial No. 561,119

6 Claims. (Cl. 223—96)

This invention relates to an improved garment hanger and has for an object the provision of such a device which is particularly adapted for manufacture by molding of thermoplastic and similar materials, thus obviating the necessity for many of the usual mechanical operations, such as machining, cutting, welding, painting and assembly, incidental to the production of similar devices.

Another important object is to provide such a device having anti-friction bearings facilitating ease of operation, and which is readily secured in assembled relationship by means of interengagement of the parts in cooperation with the spring or elastic means for applying clamping pressure.

Other objects, such as the economy of manufacture will be apparent as the invention is better understood from the following description, which, taken in connection with the accompanying drawing, discloses an embodiment thereof.

Referring to the drawing:

Figure 1 is an elevational view, illustrating an embodiment of the invention.

Fig. 2 is an end elevational view, viewing Fig. 1 from the left.

Fig. 3 is a section taken substantially on line 3—3 in Fig. 1, showing details of construction.

Fig. 4 is a section taken substantially on line 4—4, in Fig. 1, further illustrating details of construction.

Fig. 5 is a similar view, illustrating operation of the latching means; and,

Fig. 6 is a perspective view, showing the latch plate in detail.

To illustrate the invention I have shown a garment hanger including, a suspension element 11, clamp elements 12 and 13, an actuating spring 14, and a latch plate 15.

The suspension element 11 is preferably of substantially uniform thickness and includes a suitable hook portion 21, by means of which the device may be engaged with any suitable support, a carrier portion 22 preferably of suitable width for engagement in a coat or a similar garment and having slightly rounded ends, and depending abutment fingers 23 and 24, formed integral therewith and being spaced apart to provide an intermediate clearance channel 25, as shown, Fig. 1.

A serrated effect may be produced on the side faces of the abutment fingers 23 and 24, for increasing the holding efficiency thereof, by forming a plurality of horizontally disposed grooves 26 therein, as shown.

The clamp elements 12 and 13, are preferably duplicates so that they may be formed in the same molding die. These elements include, a body portion 31, which is preferably shaped to conform to the contour of the carrier portion 22 of the suspension element 11, and integral clamping fingers 32 and 33. The clamping fingers being formed to register with the abutment fingers 23 and 24, and preferably of similar shape except that they may be slightly curved inwardly toward their lower extremities as shown to increase their gripping capacity. Longitudinal grooves 34, may likewise be formed on the inside faces of the fingers 32 and 33, for maximum gripping efficiency.

The above described parts 11, 12 and 13, may be molded complete of any suitable plastic material or may be cast in metal upon occasion.

The actuating spring 14, may be a helical tension spring as shown or any suitable elastic or yieldable element capable of effecting clamping action by either tension or compression.

In accordance with a feature of the invention, pivot or fulcrum bearings 41 are provided to form a pivotal connection between the suspension element 11 and the clamp elements 12 and 13. In the present embodiment these bearings are formed by knife-edge protuberances formed integral with the carrier portion 22 of the suspension element 11, these are located directly above and intermediate the ends of the abutment fingers 23 and 24, see Figs. 1 and 3. One of the bearings 41 is provided for each one of the clamp fingers 32 and 33, and companion V shaped sockets 42, including obtuse angles, are formed in corresponding positions in the clamp elements 12 and 13 to cooperate therewith. These sockets 42 are preferably of just sufficient length to receive the bearing 41 so that when they are engaged therein, registration of the clamp fingers with the abutment fingers will be effected.

Adjacent and preferably beneath the bearings 41 and the sockets 42, the suspension element 11 and the clamp elements 12 and 13 are apertured in alignment to form a substantially continuous bore 43, for receiving the actuating springs 14, as shown, Figs. 1 and 3.

The springs 14 may be interlockingly secured in operative relationship by means of suitable anchor pins 45, engaged in the looped ends of the springs 14 and seated in suitable sockets 46, formed in the clamp elements 12 and 13 adjacent the bores 43, as shown.

Suitable abutments 47 may be provided for limiting the closing movement of the clamping fingers 32 and 33 upon occasion.

Latching means is provided for retaining the clamping fingers 32 and 33 in open position as illustrated in Fig. 5. This means includes the latch plate 15 and cooperating formations on the suspension element 11 and the clamp elements 12 and 13, as illustrated in Figs. 1, 4, and 5. The plate 15 is an elongated and relatively thin strip of flexible material, such as spring steel, which is perforated to provide a centrally located registration aperture 51, and two latching apertures 52, laterally disposed with respect to the registration aperture 51. While the apertures 51 and 52 are of rectangular form in the present embodiment it will be obvious that their form is determined by the cooperating elements and that therefore they may have other suitable forms.

A rectangular aperture 53 is formed substantially at the center of the carrier portion 22 of the suspension element 11, for receiving the plate 15, and an integral perpendicularly disposed pin 54, is located at the center of the aperture 53. The pin 54 is formed to fit snugly into the registration aperture 51, so that upon assembly, the plate 15 is interlockingly secured against relative movement in the plane of the plate thereby.

Latch lugs 55 are formed on the clamp elements 12 and 13 for engagement in the latching apertures 52, as illustrated in Figs. 1 and 5.

Suitable actuating levers 56 are formed on the clamp elements 12 and 13, and the suspension element 11 may be relieved as at 57, to permit maximum opening of the clamping fingers 32 and 33.

The entire garment hanger is formed of three relatively simple molded parts 11, 12 and 13, two helical springs 14 with looped ends, four short plain round pins 45, and one simple stamping. These parts are assembled by engaging the latch plate 15 with the pin 54, then the clamp elements 12 and 13 with the fulcrum bearings 41 of the suspension element 11, then inserting the springs 14 in the bores 43, and then inserting the anchor pins 45.

When so assembled, the parts 11, 12 and 13 are secured in operative relationship by the springs 14, and the latch plate 15 is operatively interlocked between the bottom surfaces of the latch lugs 55 and a body portion 58, of the suspension element 11.

Pressure applied to one of the actuating levers 56 moves the associated clamp element about the fulcrum bearings 41 against the action of the springs 14. The springs 14 are tensioned to exert clamping force continuously or so that at least some force will be required to start the opening of the clamping fingers from fully closed position.

Upon movement of the clamping finger 32 to the position shown at the left in Fig. 5, the latch plate 15 snaps over the latch lug 55 to lock the clamp element in the full open position. When suitable pressure is applied to a projecting end 59 of the latch plate by means of a finger, release of the clamp element is effected. This latching effect permits an operator to use both hands for filling the clamping fingers or to arrange garments therein.

It is thought that the invention and many of its attendant advantages will be understood from the foregoing description, and it will be apparent that various changes may be made in the form, construction, and arrangement of the parts without departing from the spirit and scope of the invention.

I claim:

1. A garment hanger comprising, a suspension element having a carrier portion provided with spaced depending abutment fingers, a pair of duplicate clamp elements for cooperation therewith in hanging garments, each having a body portion shaped to conform to the contour of the carrier portion of said suspension element and having depending clamping fingers disposed in registration with the abutment fingers thereon, and yieldable means for effecting clamping action, said clamp elements being disposed on opposite sides of said suspension element and being retained in operative registration therewith by means of pivot bearing connections formed in part integral with the carrier portion of said suspension element and functioning in cooperation with the yieldable means for effecting clamping action.

2. A garment hanger comprising, a suspension element provided with knife-edge fulcrum bearing forming means arranged in spaced relationship and in pairs oppositely disposed with respect to said suspension element, cooperating clamp elements having spaced V shaped cavities therein for receiving the bearing forming means in registered relationship whereby substantially frictionless clamping action is facilitated and registration is retained, and yielding means arranged to apply continuous pressure at the fulcrum bearings and similar clamping pressure to said clamp elements.

3. A garment hanger comprising, a suspension element provided with knife-edge fulcrum bearing forming means arranged in spaced relationship and in pairs oppositely disposed with respect to said suspension element, cooperating clamp elements having spaced V shaped cavities therein for receiving the bearing forming means in registered relationship whereby substantially frictionless clamping action is facilitated and registration is retained, and yielding means arranged to apply continuous pressure at the fulcrum bearings and similar clamping pressure to said clamp elements, said yielding means including a helical spring extending through said suspension element and engaged with two independent cooperating clamp elements whereby clamping tension is applied to the clamp elements simultaneously while permitting independent operation thereof.

4. For association with a garment hanger of the character described including a suspension element, and clamp elements laterally disposed with respect thereto, a latch device comprising, a flexible plate having a centrally disposed registration aperture therein adapted for interlocking engagement with the suspension element of said garment hanger and two laterally disposed latch receiving apertures either one or both of which may be engaged by a clamp element of said garment hanger, for latching the clamp elements in predetermined positions upon occasion.

5. For association with a garment hanger of the character described including a suspension element, and clamp elements laterally disposed with respect thereto, a latch device comprising, a flexible plate having a centrally disposed latch registering aperture therein wherein the suspension element may be cooperatively engaged and two other apertures laterally disposed with respect thereto and formed to receive cooperating latch elements of companion clamp devices whereby the clamp devices may be latched in predetermined positions.

6. For association with a garment hanger of the character described including a suspension element, and clamp elements laterally disposed with respect thereto, a latch device comprising, a flexible plate having a centrally disposed latch registering aperture therein wherein the suspension element may be cooperatively engaged and two other apertures laterally disposed with respect thereto and formed to receive cooperating latch elements of companion clamp devices whereby the clamp devices may be latched in predetermined positions, said flexible plate being arranged to snap into latching engagement with the latch elements and for release by flexing manually.

ELMER L. JOHNSON.